(12) United States Patent
Stoia et al.

(10) Patent No.: US 12,595,759 B2
(45) Date of Patent: Apr. 7, 2026

(54) METHODS AND SYSTEMS FOR GENERATING POWER AND THERMAL MANAGEMENT HAVING DUAL LOOP ARCHITECTURE

(71) Applicant: The Boeing Company, Chicago, IL (US)

(72) Inventors: Michael F. Stoia, Rancho Santa Margarita, CA (US); Joseph S. Silkey, Lake Saint Louis, MO (US); Jacob T. Needels, Stanford, CA (US); Kevin G. Bowcutt, Aliso Viejo, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/740,615

(22) Filed: Jun. 12, 2024

(65) Prior Publication Data

US 2024/0328348 A1 Oct. 3, 2024

Related U.S. Application Data

(63) Continuation of application No. 17/533,676, filed on Nov. 23, 2021, now Pat. No. 12,031,477.

(60) Provisional application No. 63/117,238, filed on Nov. 23, 2020.

(51) Int. Cl.
| | |
|---|---|
| *F02C 1/10* | (2006.01) |
| *F01K 7/32* | (2006.01) |
| *F01K 25/10* | (2006.01) |
| *F02C 6/18* | (2006.01) |

(52) U.S. Cl.
CPC ................. *F02C 1/10* (2013.01); *F01K 7/32* (2013.01); *F01K 25/103* (2013.01); *F02C 6/18* (2013.01); *F05D 2220/76* (2013.01); *F05D 2220/80* (2013.01)

(58) Field of Classification Search
CPC ............. F02C 1/10; F01K 25/103; F01K 7/32
See application file for complete search history.

(56) References Cited

U.S. PATENT DOCUMENTS

| | | | | |
|---|---|---|---|---|
| 2015/0101333 A1* | 4/2015 | Bond | ........................ | F02K 9/48 |
| | | | | 60/726 |
| 2019/0249599 A1* | 8/2019 | Sen | ........................... | F02C 3/04 |
| 2020/0224590 A1* | 7/2020 | McAuliffe | ................ | F02C 6/08 |

FOREIGN PATENT DOCUMENTS

| | | | | |
|---|---|---|---|---|
| CN | 108750123 B | * 10/2020 | ............. | B64D 33/08 |

* cited by examiner

*Primary Examiner* — Katheryn A Malatek
(74) *Attorney, Agent, or Firm* — Kolitch Romano Dascenzo Gates LLP

(57) ABSTRACT

Methods and apparatus for power generation and/or thermal management on a high speed flight vehicle include circulating a power generation loop working fluid through a power generation loop, which absorbs heat associated with the flight vehicle. A generator operably coupled to the power generation loop generates electrical power. Additionally, a heat transport loop working fluid may circulate through a heat transport loop to provide thermal management through heat transfer.

20 Claims, 5 Drawing Sheets

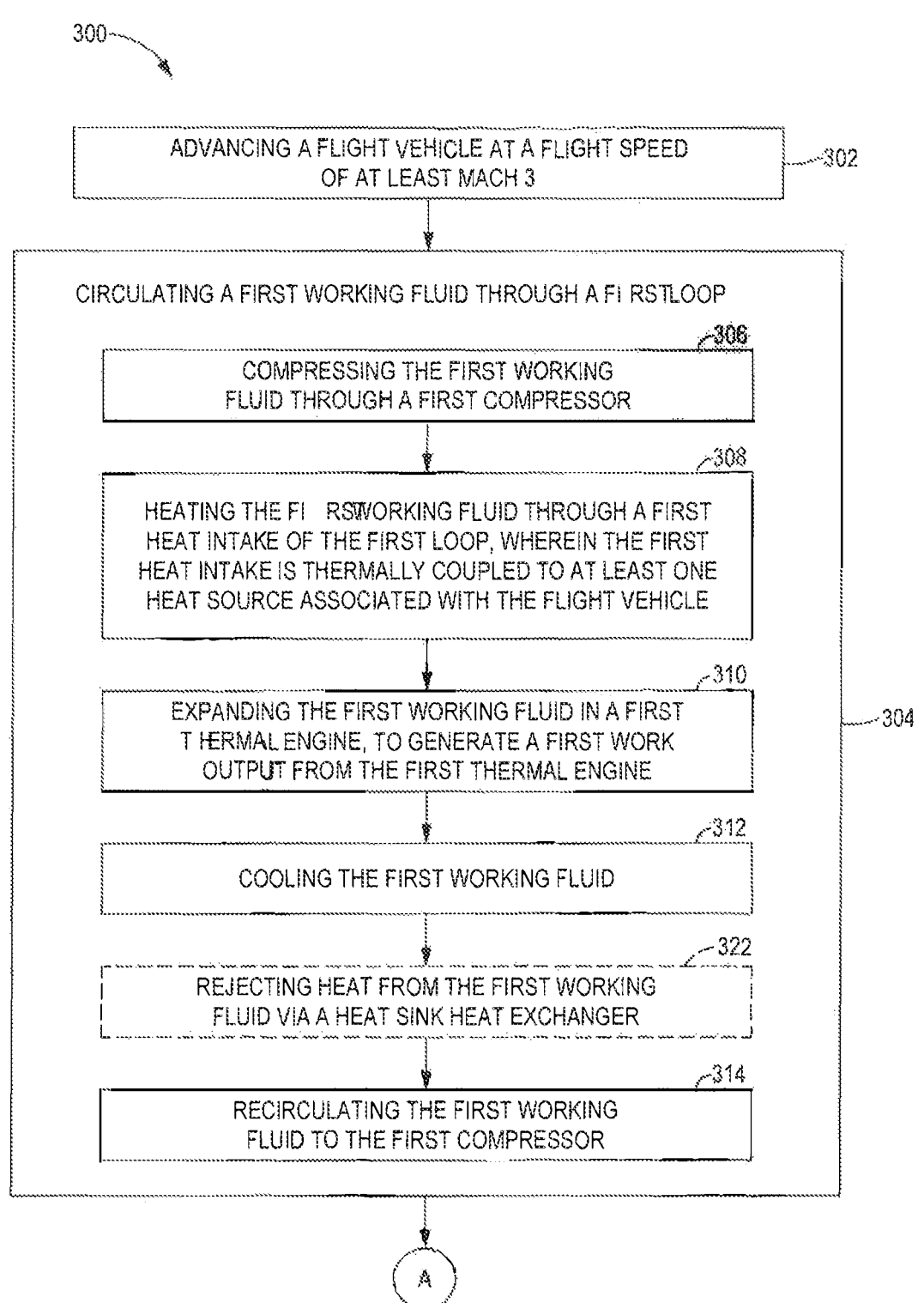

300

ADVANCING A FLIGHT VEHICLE AT A FLIGHT SPEED
OF AT LEAST MACH 3 — 302

CIRCULATING A FIRST WORKING FLUID THROUGH A FIRST LOOP

COMPRESSING THE FIRST WORKING
FLUID THROUGH A FIRST COMPRESSOR — 306

HEATING THE FIRST WORKING FLUID THROUGH A FIRST
HEAT INTAKE OF THE FIRST LOOP, WHEREIN THE FIRST
HEAT INTAKE IS THERMALLY COUPLED TO AT LEAST ONE
HEAT SOURCE ASSOCIATED WITH THE FLIGHT VEHICLE — 308

EXPANDING THE FIRST WORKING FLUID IN A FIRST
THERMAL ENGINE, TO GENERATE A FIRST WORK
OUTPUT FROM THE FIRST THERMAL ENGINE — 310

COOLING THE FIRST WORKING FLUID — 312

REJECTING HEAT FROM THE FIRST WORKING
FLUID VIA A HEAT SINK HEAT EXCHANGER — 322

RECIRCULATING THE FIRST WORKING
FLUID TO THE FIRST COMPRESSOR — 314

METHODS AND SYSTEMS FOR GENERATING POWER AND THERMAL MANAGEMENT HAVING DUAL LOOP ARCHITECTURE

CROSS-REFERENCE TO RELATED APPLICATIONS

This application is a continuation of U.S. patent application Ser. No. 17/533,676, filed on Nov. 23, 2021, which claims priority to, and the benefit of, U.S. Provisional Patent Application No. 63/117,238 filed on Nov. 23, 2020, the disclosures of which are hereby incorporated by reference in their entireties.

TECHNICAL FIELD

The present disclosure generally relates to high speed flight vehicles and, more specifically, to systems and methods for thermal management and power generation on high speed flight vehicles.

BACKGROUND

Flight vehicles traveling through atmosphere at high speeds may experience extremely high temperatures. When traveling at speeds greater than Mach 3, and more particularly at hypersonic speeds greater than Mach 5, temperatures can locally exceed 1000 degrees Fahrenheit, necessitating the use of high density materials such as superalloys or expensive non-metallic materials such as ceramic matrix composites. Additionally, turbofan and turbojet engines cannot be used at speeds much above Mach 3 without air cooling. Moreover, as speed increases, a greater fraction of the total engine air flow is diverted around the turbomachinery into an augmenter, also called an afterburner, which is essentially a ramjet. As a result, a smaller amount of power is generated by the turbine, therefore the ability of the turbine to generate electrical power for vehicle systems is diminished.

SUMMARY

In accordance with one aspect of the present disclosure, a method of providing cooling and/or generating power on board a flight vehicle using heated inlet air associated with the flight vehicle includes advancing the flight vehicle at a flight speed of at least Mach 3. A first working fluid is circulated through a first fluid loop including, in sequence: compressing the first working fluid through a first compressor; heating the first working fluid through an inlet air heat exchanger, the inlet air heat exchanger including an inlet air line fluidly communicating with the heated inlet air and a first air-to-loop line located in thermally coupled relation to the inlet air line; expanding the first working fluid in a first thermal engine to generate a first work output from the first thermal engine; cooling the first working fluid; and recirculating the first working fluid to the first compressor.

In accordance with another aspect of the present disclosure, a system for providing cooling and/or generating power on board a flight vehicle using heated inlet air associated with the flight vehicle traveling at a flight speed of at least Mach 3 comprises a first fluid loop containing a first working fluid. The first fluid loop includes, in sequence a first compressor for compressing the first working fluid; an inlet air heat exchanger, the inlet air heat exchanger including an inlet air line fluidly communicating with the heated inlet air, and a first air-to-loop line receiving the first working fluid and located in thermally coupled relation to the inlet air line; and a first thermal engine for expanding the first working fluid and generating a first work output.

In accordance with a further aspect of the present disclosure, a system for providing cooling and generating power on board a flight vehicle using heated inlet air associated with the flight vehicle traveling at a flight speed of at least Mach 3 comprises a power generation loop containing a power generation loop working fluid. The power generation loop includes, in sequence: a power generation loop compressor for compressing the power generation loop working fluid; an inlet air heat exchanger, the inlet air heat exchanger including an inlet air line fluidly communicating with the heated inlet air, and a first air-to-loop line receiving the power generation loop working fluid and located in thermally coupled relation to the inlet air line; and a power generation loop thermal engine for expanding the power generation loop working fluid and generating a power generation loop work output. The system further comprises a heat transport loop containing a heat transport loop working fluid. The heat transport loop includes, in sequence: a heat transport loop compressor for compressing the heat transport loop working fluid; the inlet air heat exchanger, the inlet air heat exchanger including a second air-to-loop line receiving the heat transport loop working fluid and located in thermally coupled relation to the inlet air line; and a heat transport loop thermal engine for expanding the heat transport loop working fluid and generating a heat transport work output, wherein the heat transport work output is mechanically coupled to the heat transport loop compressor. A generator is operably coupled to the power generation loop thermal engine and configured to receive at least a portion of the power generation loop work output and generate auxiliary electrical power. A controller is operably coupled to the power generation loop compressor and the heat transport loop compressor, wherein the controller is programmed to execute a method, comprising initiating operation of the power generation loop compressor and the heat transport loop compressor when a flight speed of the flight vehicle is above Mach 3.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of illustrative examples of the present disclosure when read in conjunction with the accompanying drawings, wherein:

DETAILED DESCRIPTION

The figures and the following description illustrate specific examples of the claimed subject matter. It will thus be appreciated that those skilled in the art will be able to devise various arrangements that, although not explicitly described or shown herein, embody the principles of the examples and are included within the scope of the examples. Furthermore, any examples described herein are intended to aid in understanding the principles of construction, operation, or other features of the disclosed subject matter, and are to be construed as being without limitation to such specifically recited examples and conditions. As a result, the inventive concept(s) is not limited to the specific examples described below, but by the claims and their equivalents.

Examples of integrated cooling and power generation systems described herein simultaneously provide cooling and generate electric power to a high speed flight vehicle. At high speeds, the flight vehicle experiences one or more sources of heat. The sources of heat may be inlet air, a surface of the vehicle, or other source. The system absorbs heat from the one or more sources of heat, providing cooling, and uses that heat to generate a mechanical output. The mechanical output may be used directly in the system itself, or it may be converted to electrical power that may be used to power components of the integrated cooling and power generation system or sub-systems provided on the flight vehicle. In certain examples, the integrated cooling and power generation system has a dual loop architecture, with a power generation loop used to generate electrical power and a heat transport loop used to provide mechanical power. In some embodiments, each of the power generation loop and the heat transport loop has a Brayton cycle architecture. In the dual loop embodiments, the power generation loop is configured primarily to optimize conversion of heat into electric power, while the heat transport loop is configured primarily to optimize heat transfer from the one or more sources of heat. Thus, the dual loop architecture decouples power generation from mass heat transfer, permitting each loop to have components and operating conditions that are optimized for their respective primary functions. While embodiments are disclosed herein having both the power generation loop and the heat transport loop, it will be appreciated that the integrated cooling and power generation system may include only the power generation loop or, alternatively, only the heat transport loop.

Figure 1:
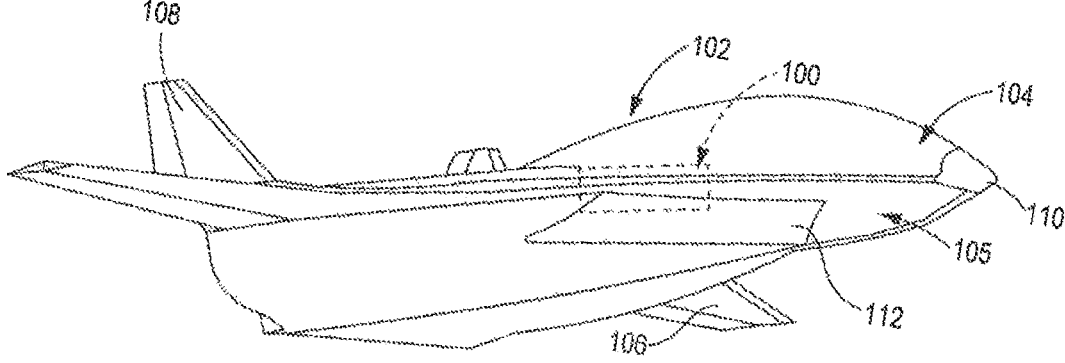
FIG. 1 is a perspective view of a high speed flight vehicle having an integrated cooling and power generation system according to the present disclosure.

FIG. 1 illustrates an example of a high speed flight vehicle 102. The flight vehicle 102 may be operated manned or unmanned as desired. The flight vehicle 102 is just one configuration of a flight vehicle capable of traveling at a speed of at least Mach 3, and other configurations, not shown, may be implemented as desired. For example, the flight vehicle 102 may have a different shape, size, aspect ratio, etc., as desired. Thus, the flight vehicle 102 is merely shown in a particular configuration for purposes of discussion.

In this example, the flight vehicle 102 provides one or more sources of heat when traveling at high speeds. For example, once source of heat may be provided by aerodynamic heating of a first surface 104 of the flight vehicle 102. In some examples, the first surface 104 is provided on a leading surface, such as on a wing 106, tail 108, nose cap 110, or air inlet duct 112 of the flight vehicle 102. During operation of the flight vehicle 102 above Mach 3, or in hypersonic flight (e.g., the flight vehicle 102 moves at hypersonic speeds of Mach 5 and above), the first surface 104 may be aerodynamically heated to 1000 degrees Fahrenheit or more. Additionally or alternatively, another source of heat may be inlet air directed into the flight vehicle 102 when traveling at high speeds. The inlet air may include air traveling through the air inlet duct 112 or through other structures provided on the flight vehicle 102.

The flight vehicle 102 includes an integrated cooling and power generation system 100 that cools and/or generates power from the one or more sources of heat. When using the first surface 104 as the source of heat, the system 100 cools the first surface 104, which allows the first surface 104 to be formed of materials that do not need to be rated for excessive temperature, lowering material cost and reducing material weight. Additionally or alternatively, converting the heat from the one or more sources of heat into electric power reduces the need for batteries or other conventional power sources and, consequently, the weight associated with such conventional power sources.

Figure 2:
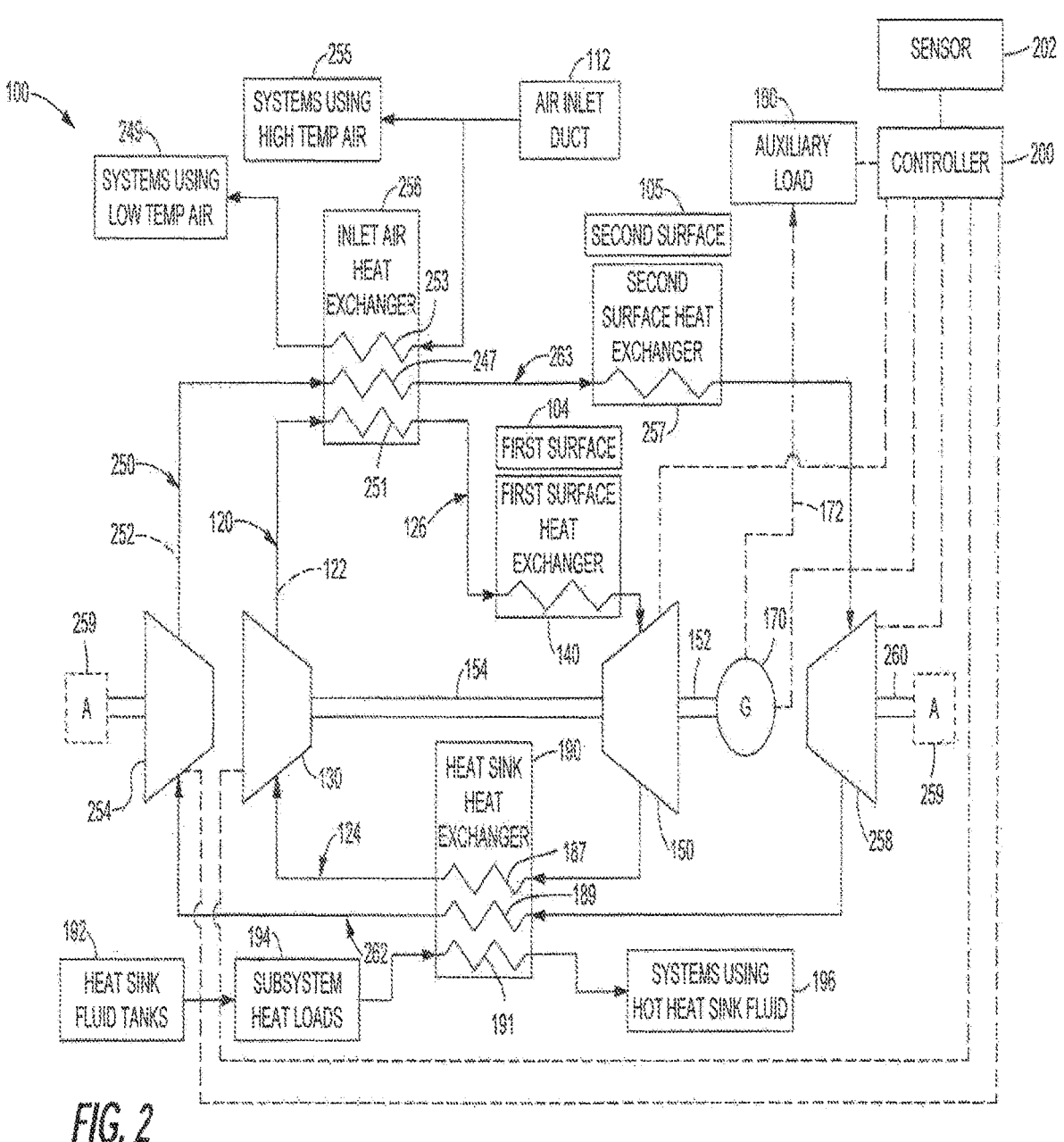
FIG. 2 is a schematic illustration of the integrated cooling and power generation system.
Figure 3:
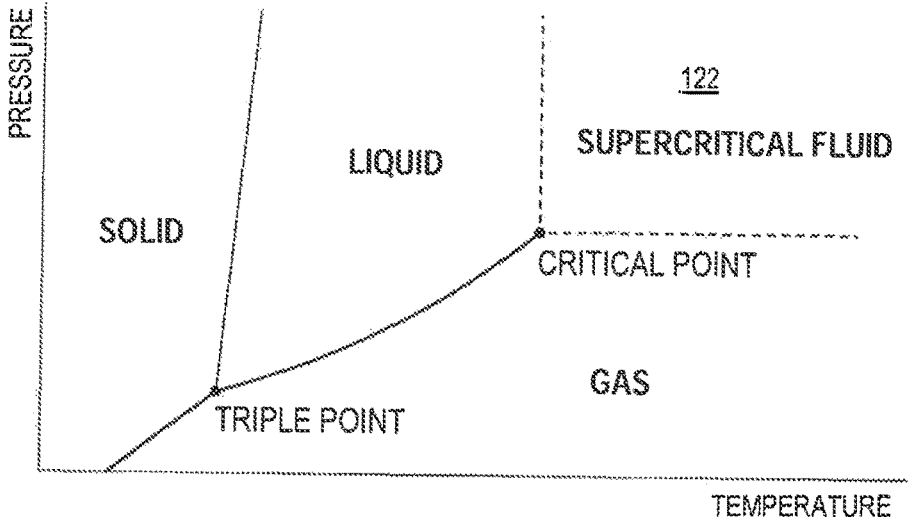
FIG. 3 is a graph illustrating an exemplary supercritical fluid for use in the integrated cooling and power generation system.

As best shown in FIG. 2, the system 100 includes a power generation loop 120 through which is circulated a power generation loop working fluid 122. In the illustrated example, the power generation loop 120 is formed as a closed loop having a Brayton cycle architecture. When the flight vehicle 102 is operated at speeds above Mach 3, heat from the one or more sources of heat is transferred to the power generation loop working fluid 122 in the power generation loop 120 to maintain the power generation loop working fluid 122 at a temperature and pressure above its critical point. The one or more sources of heat may be inlet air, the first surface 104, or other source. FIG. 3 graphically illustrates the critical point of a substance, where temperatures and pressures above the critical point will result in a supercritical state. In some examples, the power generation loop working fluid 122 circulating through the power generation loop 120 is supercritical carbon dioxide.

The system 100 includes components disposed in the power generation loop 120 for performing a sequence of thermodynamic processes involving transfer of heat and work into and out of the system 100, while varying temperature and pressure of the power generation loop working fluid 122 within the system. As schematically illustrated in FIG. 2, the system 100 includes a power generation loop compressor 130 for compressing the power generation loop working fluid 122 to an increased pressure.

The power generation loop 120 further includes one or more heat intakes for absorbing heat from the one or more sources of heat. In the illustrated example, a first heat intake of the power generation loop 120 is an inlet air heat exchanger 256 that transfers heat from the inlet air to the power generation loop working fluid 122. In the example illustrated at FIG. 2, an inlet air line 253 passes through the inlet air heat exchanger 256. An upstream end of the inlet air line 253 is fluidly coupled to an inlet air source, such as the air inlet duct 112. High temperature air systems 255 on board the flight vehicle 102 are fluidly coupled directly to the air inlet duct 112, thus bypassing the inlet air heat exchanger 256. Low temperature air systems 249 are fluidly coupled to a downstream end of the inlet air line 253. The inlet air heat exchanger 256 also includes an air-to-power generation loop line 251 that is located in thermally coupled relation to the inlet air line 253 to transfer heat from the inlet air to the power generation loop working fluid 122. Additionally or alternatively, the power generation loop 120 includes a second heat intake in the form of a first surface heat exchanger 140 that is located in thermally coupled relation to the first surface 104 of the flight vehicle 102.

A power generation loop thermal engine 150 is disposed in the power generation loop 120 for extracting a power generation loop work output 152 from the power generation loop working fluid 122 by expanding the power generation loop working fluid 122 to a decreased pressure. While FIG. 2 schematically illustrates the power generation loop thermal engine 150 as a turbine, other types of thermal engines capable of extracting work output from a heated and pressurized working fluid may be used. In the illustrated example, the power generation loop work output 152 is in the form of a rotating output shaft of the turbine that is mechanically coupled to the power generation loop compressor 130 by a shaft 154 to operate the power generation loop compressor 130. In alternative examples, the power generation loop compressor 130 may be electrically operated, in which case the power generation loop work output 152 is mechanically coupled to a generator, which converts the mechanical energy into electrical power to drive the power generation loop compressor 130. As discussed in greater detail below, that electrical power may be used to also power other vehicle systems.

Additionally, a generator 170 is operably coupled to the power generation loop thermal engine 150. The generator 170 receives at least a portion of the power generation loop work output 152 from the power generation loop thermal engine 150 and generates a source of electrical power 172. In this example, an auxiliary load 180 is operably coupled to the generator 170 and is configured to operate using the source of electrical power 172. The auxiliary load 180 may be an environmental control system (ECS), one or more flight control devices (e.g., actuators), an avionics system, a payload, or other device or system requiring electrical power. Still further, the source of electrical power 172 may also be used to power components of the integrated cooling and power generation system 100, such as the power generation loop compressor 130 and/or a heat transport loop compressor 254. It will be appreciated that the power generation loop compressor 130 and the power generation loop thermal engine 150 generally divide the power generation loop 120 into a low pressure leg 124, extending downstream of the power generation loop thermal engine 150 to an inlet of the power generation loop compressor 130, and a high pressure leg 126, extending upstream of the power generation loop thermal engine 150 to an outlet of the power generation loop compressor 130.

The system 100 further includes a heat transport loop 250 through which is circulated a heat transport loop working fluid 252. In the illustrated example, the heat transport loop 250 is formed as a closed loop that also has a Brayton cycle architecture. The heat transport loop working fluid 252 in the heat transport loop 250 may also be a high-temperature working fluid, such as supercritical carbon dioxide.

Components are disposed in the heat transport loop 250 for performing a sequence of thermodynamic processes involving transfer of heat and work into and out of the system 100, while varying temperature and pressure of the heat transport loop working fluid 252 within the system. As schematically illustrated in FIG. 2, the system 100 includes the heat transport loop compressor 254 for compressing the heat transport loop working fluid 252 to an increased pressure.

The heat transport loop 250 further includes one or more heat intakes for absorbing heat from the one or more sources of heat. In the illustrated example, a first heat intake of the heat transport loop 250 is the inlet air heat exchanger 256 that transfers heat from the inlet air to the heat transport loop working fluid 252. In the example illustrated at FIG. 2, the inlet air heat exchanger 256 includes an air-to-heat transport loop line 247 that is located in thermally coupled relation to the inlet air line 253 to transfer heat from the inlet air to the heat transport loop working fluid 252. Additionally or alternatively, the heat transport loop 250 includes a second heat intake in the form of a second surface heat exchanger 257 that is located in thermally coupled relation to a second surface 105 of the flight vehicle 102.

A heat transport loop thermal engine 258 is disposed in the heat transport loop 250 for extracting a heat transport work output 260 from the heat transport loop working fluid 252 by expanding the heat transport loop working fluid 252 to a decreased pressure. While FIG. 2 schematically illustrates the heat transport loop thermal engine 258 as a turbine, other types of thermal engines capable of extracting work output from a heated and pressurized working fluid may be used. In the illustrated example, the heat transport work output 260 is in the form of a rotating output shaft of the turbine that is mechanically coupled to the heat transport loop compressor 254 by a shaft 259 to operate the power generation loop compressor 130. Additionally, it will be appreciated that the heat transport loop compressor 254 and the heat transport loop thermal engine 258 generally divide the heat transport loop 250 into a low pressure leg 262, extending downstream of the heat transport loop thermal engine 258 to an inlet of the heat transport loop compressor 254, and a high pressure leg 263, extending upstream of the heat transport loop thermal engine 258 to an outlet of the heat transport loop compressor 254.

In the example illustrated in FIG. 2, the system 100 further includes a heat sink heat exchanger 190 for removing excess heat from the power generation loop working fluid 122 and the heat transport loop working fluid 252. The heat sink heat exchanger 190 is disposed in the low pressure legs 124, 262, respectively, of the power generation loop 120 and heat transport loop 250. By removing heat from the power generation loop working fluid 122 and the heat transport loop working fluid 252, the heat sink heat exchanger 190 ensures that the temperatures of the power generation loop working fluid 122 and the heat transport loop working fluid 252 do not exceed the rated operating temperature ranges for the power generation loop compressor 130 and the heat transport loop compressors 254. Additionally, the excess heat may be rejected to the surrounding atmosphere or transferred to a secondary fluid in another system on board the flight vehicle 102. In the illustrated example, the heat sink heat exchanger 190 further includes a heat sink line 191 passing through the heat sink heat exchanger 190. An upstream end of the heat sink line 191 fluidly communicates with one or more heat sink fluid tanks 192 carrying heat sink fluid (e.g., fuel, water, or other fluid carried on board the flight vehicle 102). The upstream end of the heat sink line 191 further may communicate with subsystem heat loads 194. A downstream end of the heat sink line 191 may fluidly communicate with other vehicle systems using hot heat sink fluid 196, and which can utilize heated heat sink fluid. The heat sink heat exchanger 190 includes a heat sink-to-power generation loop line 187 and a heat sink-to-heat transport loop line 189, both of which are located in thermally coupled relation to the heat sink line 191 to transfer heat from the inlet air to the power generation loop working fluid 122 and the heat transport loop working fluid 252, respectively.

In the illustrated example, a controller 200 is provided to control operation of the system 100. In FIG. 2, the controller 200 is operably coupled to the power generation loop compressor 130 and the heat transport loop compressor 254, and is programmed to execute a method that includes initiating operation of the power generation loop compressor 130 and the heat transport loop compressor 254 when one or more operating conditions of the flight vehicle 102 is favorable for maintaining the power generation loop working fluid 122 and the heat transport loop working fluid 252 in supercritical states. In some examples, the operating condition is temperature of the one or more sources of heat, such as inlet air temperature or a temperature of the first or second surfaces 104, 105, in which case the controller 200 receives feedback from a sensor 202 configured to detect temperature and is programmed to start the power generation loop compressor 130 and heat transport loop compressor 254 when the detected temperature exceeds a threshold temperature. Exemplary threshold temperatures include, but are not limited to, 500 degrees F., 600 degrees F., 700 degrees F., 800 degrees F., 900 degrees F., and 1000 degrees F. In other examples, the operating condition is a flight speed of the flight vehicle 102, which is indicative of a temperature of the one or more sources of heat. In these examples, the controller 200 receives an indication of flight speed, such as from an input command or sensor 202 when configured to determine flight speed, and is programmed to start the power generation loop compressor 130 and the heat transport loop compressor 254 when the flight vehicle 102 reaches a threshold flight speed. Exemplary threshold flight speeds include, but are not limited to, Mach 3, Mach 3.5, Mach 4, and hypersonic speed (i.e., Mach 5 or greater). Additionally, the controller 200 may be operably coupled to the power generation loop thermal engine 150 and the heat transport loop thermal engine 258.

In the example illustrated in FIG. 2, the controller 200 further is operably coupled to the generator 170 and the auxiliary load 180 to control operation or other aspects of those components. Because of the thermal efficiency, compact size, and reduced weight afforded by the use of a supercritical working fluid as the power generation loop working fluid 122 and the heat transport loop working fluid 252, the integrated cooling and power generation system 100 achieves gravimetric and volumetric power densities that are an order of magnitude greater than batteries or other conventional power sources.

While the specific hardware implementation of the controller 200 is subject to design choices, one particular example includes one or more processors coupled with a current driver. The one or more processors may include any electronic circuits and/or optical circuits that are able to perform the functions described herein. For example, the processor(s) may perform any functionality described herein for controller 200. The processor(s) may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

The system 100 is configured to maintain the power generation loop working fluid 122 and the heat transport loop working fluid 252 in supercritical states during the entire thermodynamic cycle, enabling the use of lighter and more compact turbomachinery. When the power generation loop working fluid 122 and the heat transport loop working fluid 252 are carbon dioxide, for example, the critical temperature is approximately 88 degrees F. and the critical pressure is approximately 74 bar. Temperature of the one or more sources of heat increases with the speed of the flight vehicle 102. For example, at a speed of Mach 3.5, inlet air and/or the first and second surfaces 104, 105 may reach 750 degrees F. or more, which would be sufficient to maintain the power generation loop working fluid 122 and the heat transport loop working fluid 252 in supercritical states. At hypersonic speeds in excess of Mach 5, the temperature of the one or more sources of heat may reach 1000 degrees Fahrenheit. Thermodynamic efficiency of the system 100 increases with the temperature of the one or more sources of heat. Additionally, the power generation loop compressor 130 and the heat transport loop compressor 254 are sized to maintain pressures of the power generation loop working fluid 122 and the heat transport loop working fluid 252 above the critical pressures throughout the thermodynamic cycle. Because the power generation loop working fluid 122 and the heat transport loop working fluid 252 are in supercritical states, the power generation loop compressor 130, the heat transport loop compressor 254, the power generation loop thermal engine 150, and the heat transport loop thermal engine 258, may have reduced sizes and weights, making the system 100 feasible for use on board the flight vehicle 102. Additionally, the illustrated system 100 is a closed loop system that is provided independent of a propulsion system of the flight vehicle 102. Operating conditions for the power generation loop and the heat transport loop may be optimized for their respective primary functions. For example, the power generation loop working fluid 122 may have a higher pressure ratio than the heat transport loop working fluid 252. In some examples using supercritical carbon dioxide as both the power generation loop working fluid 122 and the heat transport loop working fluid 252, the power generation loop working fluid 122 may have a pressure ratio of approximately 3 while the heat transport loop working fluid 252 may have a pressure ratio of approximately 1. As used herein, the term "pressure ratio" means the ratio of inlet to outlet pressure across the compressor (i.e., the power generation loop compressor 130 and the heat transport loop compressor 254).

Figure 4:
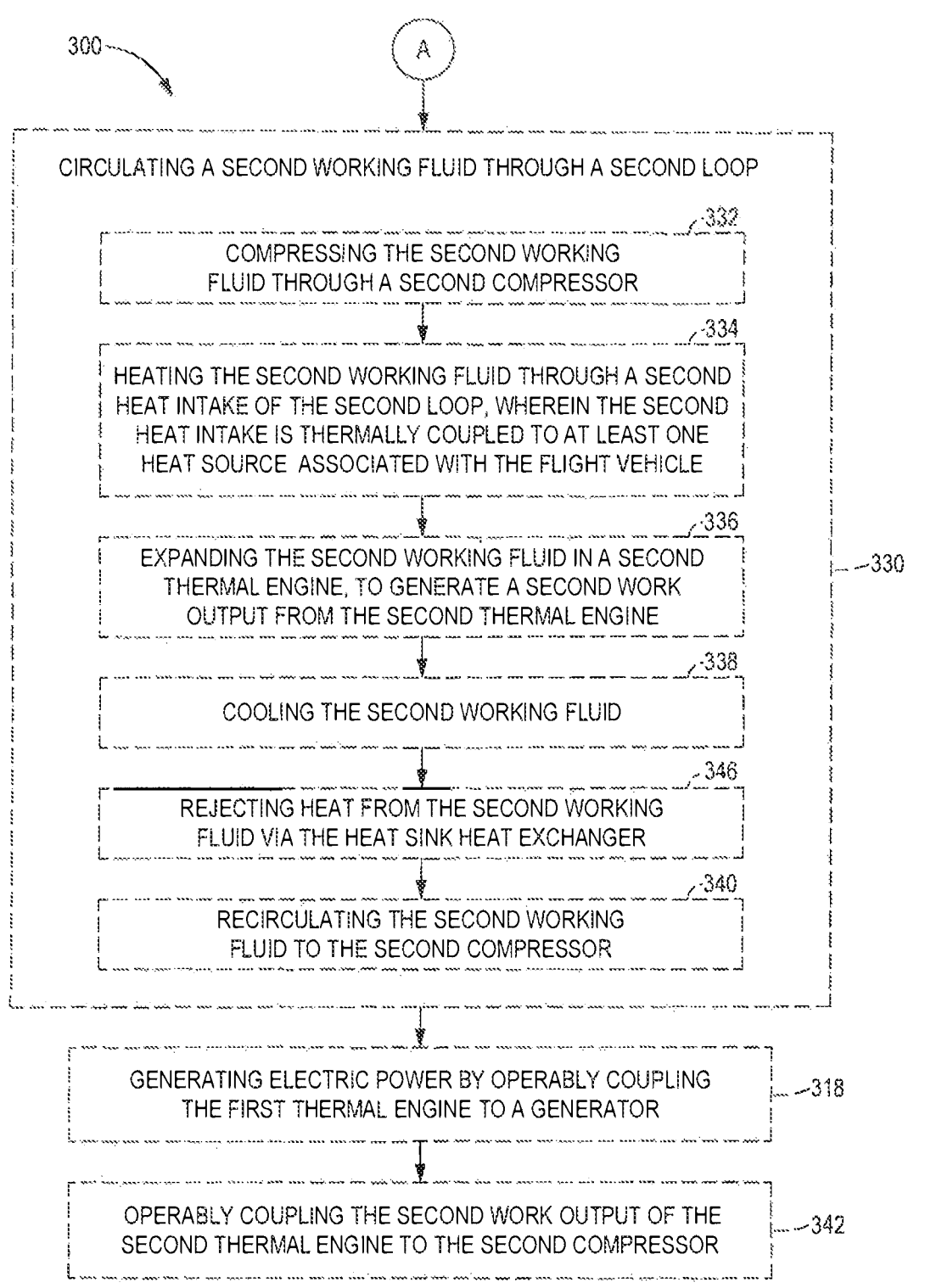
FIG. 4 is a block diagram illustrating a method of using heat associated with the high speed flight vehicle of FIG. 1 for power generation and/or thermal management on the flight vehicle.

FIG. 4 is a block diagram illustrating a method 300 of power generation and/or thermal management on board the flight vehicle 102. The method 300 begins at block 302 by advancing the flight vehicle 102 at a flight speed of at least Mach 3, during which the one or more sources of heat increase in temperature. At block 304, a first working fluid, such as the power generation loop working fluid 122, is circulated through a first loop, such as the power generation loop 120. Circulating the first working fluid through the first loop includes, in sequence, compressing the first working fluid through a first compressor (e.g., compressing the power generation loop working fluid 122 through the power generation loop compressor 130) as shown at block 306; heating the first working fluid through a first heat intake of the first loop, wherein the first heat intake is thermally coupled to at least one heat source associated with the flight vehicle 102 (e.g., heating the power generation loop working fluid 122 through the one or more heat intakes of the power generation loop 120) as shown at block 308; and expanding the first working fluid in a first thermal engine to generate a first work output from the first thermal engine (e.g., expanding the power generation loop working fluid 122 in the power generation loop thermal engine 150 to generate a power generation loop work output 152 from the power generation loop thermal engine 150) as shown at block 310. Circulating the first working fluid through the first loop 304 further includes cooling the first working fluid (e.g., cooling the power generation loop working fluid 122) as shown at block 312, and recirculating the first working fluid to the first compressor (e.g., recirculating the power generation loop working fluid 122 to the power generation loop compressor 130) as shown at block 314.

The method 300 further may continue at block 330 by circulating a second working fluid through a second loop (e.g., circulating the heat transport loop working fluid 252 through the heat transport loop 250). Circulating the second working fluid through the second loop includes, in sequence, compressing the second working fluid through a second compressor (e.g., compressing the heat transport loop working fluid 252 through the heat transport loop compressor 254) as shown at block 332; heating the second working fluid through a second heat intake of the second loop, wherein the second heat intake is thermally coupled to at least one heat source associated with the flight vehicle 102 (e.g., heating the heat transport loop working fluid 252 through the one or more heat intakes of the heat transport loop 250) as shown at block 334; and expanding the second working fluid in a second thermal engine to generate a second work output from the second thermal engine (e.g., expanding the heat transport loop working fluid 252 in the heat transport loop thermal engine 258 to generate a heat transport work output 260 from the heat transport loop thermal engine 258) as shown at block 336. Circulating the second working fluid through the second loop further includes cooling the second working fluid (e.g., cooling the heat transport loop working fluid 252) as shown at block 338, and recirculating the second working fluid to the second compressor (e.g., recirculating the heat transport loop working fluid 252 to the heat transport loop compressor 254) as shown at block 340.

In the illustrated example, the method 300 further includes generating electrical power. For example, as schematically shown in FIG. 4, the method 300 includes generating electric power by operably coupling the first thermal engine to a generator (e.g., generating the source of electric power 172 by mechanically coupling the power generation loop work output 152 of the power generation loop thermal engine 150 to the generator 170) as shown at block 318. The source of electrical power 172 from the generator 170 may be used to operate the power generation loop compressor 130 and/or the heat transport loop compressor 254, when those components are powered electrically. Additionally or alternatively, the source of electric power 172 may be used to power an auxiliary load 180. Additionally, the method 300 includes operably coupling the second work output of the second thermal engine to the second compressor (e.g., operably coupling the heat transport work output 260 of the heat transport loop thermal engine 258 to the heat transport loop compressor 254) as shown at block 342.

Still further, the method 300 may optionally include additional steps to reduce the temperature of the first working fluid and the second working fluid prior to being recirculated back to the first compressor and the second compressor, respectively. More specifically, the method 300 may include rejecting heat from the first working fluid via a heat sink heat exchanger (e.g., rejecting heat from the power generation loop working fluid 122 using the heat sink heat exchanger 190) as shown at block 322, and rejecting heat from the second working fluid via the heat sink heat exchanger (e.g., rejecting heat from the heat transport loop working fluid 252 using the heat sink heat exchanger 190) as shown at block 346.

In the foregoing examples, it will be appreciated that the terms "first loop" and "second loop" are intended to refer to either one of the power generation loop 120 and the heat transport loop 250. That is, while the above examples identify the power generation loop 120 as the "first loop" and the heat transport loop 250 as the "second loop", in alternative examples, the heat transport loop 250 is the "first loop" and the power generation loop 120 is the "second loop".

Additionally, the terms "first working fluid" and "second working fluid" are intended to refer to either one of the power generation loop working fluid 122 and the heat transport loop working fluid 252. That is, while the above examples identify the power generation loop working fluid 122 as the "first working fluid" and the heat transport loop working fluid 252 as the "second working fluid", in alternative examples, the heat transport loop working fluid 252 is "the first working fluid" and the power generation loop working fluid 122 is "the second working fluid".

Still further, the terms "first compressor" and "second compressor" are intended to refer to either one of the power generation loop compressor 130 and the heat transport loop compressor 254. That is, while the above examples identify the power generation loop compressor 130 as the "first compressor" and the heat transport loop compressor 254 as the "second compressor", in alternative examples, the heat transport loop compressor 254 is the "first compressor" and the power generation loop compressor 130 is the "second compressor".

Yet further, the terms "first thermal engine" and "second thermal engine" are intended to refer to either one of the power generation loop thermal engine 150 and the heat transport loop thermal engine 258. That is, while the above examples identify the power generation loop thermal engine 150 as the "first thermal engine" and the heat transport loop thermal engine 258 as the "second thermal engine", in alternative examples, the heat transport loop thermal engine 258 is the "first thermal engine" and the power generation loop thermal engine 150 is the "second thermal engine".

The term "sequence", as used herein, generally refers to elements (e.g., unit operations) in order. Such order can refer to process order, such as, for example, the order in which a working fluid flows from one element to another. In an example, a compressor, heat storage unit and turbine in sequence includes the compressor upstream of the heat exchange unit, and the heat exchange unit upstream of the turbine. In such a case, a working fluid can flow from the compressor to the heat exchange unit and from the heat exchange unit to the turbine. A working fluid flowing through unit operations in sequence can flow through the unit operations sequentially. A sequence of elements can include one or more intervening elements. For example, a system comprising a compressor, heat storage unit and turbine in sequence can include an auxiliary tank between the compressor and the heat storage unit. A sequence of elements can be cyclical.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP)

hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific examples were described herein, the scope is not limited to those specific examples. Rather, the scope is defined by the following claims and any equivalents thereof.

What is claimed is:

1. A system for providing cooling and/or generating power on board a flight vehicle using heated inlet air associated with the flight vehicle traveling at a flight speed of at least Mach 3, the system comprising:
   a first fluid loop containing a first working fluid, the first fluid loop including, in sequence:
      a first compressor for compressing the first working fluid;
      an inlet air heat exchanger, the inlet air heat exchanger including an inlet air line fluidly communicating with the heated inlet air, and a first air-to-loop line receiving the first working fluid and located in thermally coupled relation to the inlet air line;
      a first thermal engine for expanding the first working fluid and generating a first work output;
   a second fluid loop containing a second working fluid, the second fluid loop including, in sequence:
      a second compressor for compressing the second working fluid;
      the inlet air heat exchanger, the inlet air heat exchanger including a second air-to-loop line receiving the second working fluid and located in thermally coupled relation to the inlet air line; and
      a second thermal engine for expanding the second working fluid and generating a second work output.

2. The system of claim 1, in which the first fluid loop comprises a power generation loop, the system further comprising a generator operably coupled to the first work output and configured to generate electrical power.

3. The system of claim 1, in which the first fluid loop comprises a heat transport loop, and in which the first work output of the first thermal engine is operably coupled to the first compressor.

4. The system of claim 1, in which the first fluid loop comprises a power generation loop and the second fluid loop comprises a heat transfer loop, the system further comprising a generator operably coupled to the first work output and configured to generate electrical power, and in which the second work output of the second thermal engine is operably coupled to the second compressor.

5. The system of claim 4, further comprising a first surface heat exchanger, located in thermally coupled relation to a first surface of the flight vehicle, for heating the first working fluid of the power generation loop.

6. The system of claim 5, further comprising a second surface heat exchanger, located in thermally coupled relation to a second surface of the flight vehicle, for heating the second working fluid of the heat transfer loop.

7. The system of claim 6, further comprising a heat sink heat exchanger, the heat sink heat exchanger including:
   a heat sink line fluidly communicating with a heat sink fluid tank;
   a heat sink-to-power generation loop line receiving the first working fluid and located in thermally coupled relation to the heat sink line; and
   a heat sink-to-heat transport loop line receiving the second working fluid and located in thermally coupled relation to the heat sink line.

8. The system of claim 1, further comprising a controller operably coupled to the first compressor and the second compressor, wherein the controller is programmed to execute a method, comprising initiating operation of the first and second compressors when an operating condition of the flight vehicle exceeds an operating threshold.

9. The system of claim 1, wherein the first fluid loop is configured to recirculate the first working fluid to the first compressor.

10. A system for providing cooling and generating power on board a flight vehicle using heated inlet air associated with the flight vehicle traveling at a flight speed of at least Mach 3, the system comprising:
   a power generation loop containing a power generation loop working fluid, the power generation loop including, in sequence:
      a power generation loop compressor for compressing the power generation loop working fluid;
      an inlet air heat exchanger, the inlet air heat exchanger including an inlet air line fluidly communicating with the heated inlet air, and a first air-to-loop line receiving the power generation loop working fluid and located in thermally coupled relation to the inlet air line; and
      a power generation loop thermal engine for expanding the power generation loop working fluid and generating a power generation loop work output;
   a heat transport loop containing a heat transport loop working fluid, the heat transport loop including, in sequence:
      a heat transport loop compressor for compressing the heat transport loop working fluid;
      the inlet air heat exchanger, the inlet air heat exchanger including a second air-to-loop line receiving the heat transport loop working fluid and located in thermally coupled relation to the inlet air line; and
      a heat transport loop thermal engine for expanding the heat transport loop working fluid and generating a heat transport work output, wherein the heat transport work output is mechanically coupled to the heat transport loop compressor;
   a generator operably coupled to the power generation loop thermal engine and configured to receive at least a portion of the power generation loop work output and generate auxiliary electrical power; and
   a controller operably coupled to the power generation loop compressor and the heat transport loop compressor, wherein the controller is programmed to execute a method, comprising initiating operation of the power generation loop compressor and the heat transport loop compressor when a flight speed of the flight vehicle is above Mach 3.

11. The system of claim 10, further comprising an auxiliary load operably coupled to the generator.

12. The system of claim 10, further comprising a heat sink heat exchanger, the heat sink heat exchanger including:

a heat sink line fluidly communicating with a heat sink fluid tank;

a heat sink-to-power generation loop line receiving the power generation loop working fluid and located in thermally coupled relation to the heat sink line; and a heat sink-to-heat transport loop line receiving the heat transport loop working fluid and located in thermally coupled relation to the heat sink line.

13. A system for providing cooling and/or generating power on board a flight vehicle using heated inlet air associated with the flight vehicle traveling at a flight speed of at least Mach 3, the system comprising:

a first fluid loop containing a first working fluid, the first fluid loop including, in sequence:

a first compressor configured to compress the first working fluid;

an inlet air heat exchanger, the inlet air heat exchanger comprising:

an inlet air line configured to fluidly communicate with the heated inlet air, and a first air-to-loop line configured to receive the first working fluid and configured to receive heat from the inlet air line and increase a temperature of the first working fluid; and a first thermal engine configured to expand the first working fluid and generate a first work output;

a second fluid loop containing a second working fluid, the second fluid loop including, in sequence:

a second compressor configured to compress the second working fluid;

the inlet air heat exchanger, the inlet air heat exchanger comprising a second air-to-loop line configured to receive the second working fluid and configured to receive heat from the inlet air line and increase a temperature of the second working fluid; and a second thermal engine configured to expand the second working fluid and generate a second work output.

14. The system of claim 13, further comprising a generator operably coupled to the first work output and configured to generate electrical power, wherein the first fluid loop comprises a power generation loop.

15. The system of claim 13, wherein the first fluid loop comprises a heat transport loop, and wherein the first work output of the first thermal engine is operably coupled to the first compressor.

16. The system of claim 13, wherein the first fluid loop comprises a power generation loop and the second fluid loop comprises a heat transfer loop, the system further comprising a generator operably coupled to the first work output and configured to generate electrical power, and wherein the second work output of the second thermal engine is operably coupled to the second compressor.

17. The system of claim 16, further comprising a first surface heat exchanger configured to receive heat from a first surface of the flight vehicle, and configured to increase the temperature of the first working fluid of the power generation loop.

18. The system of claim 17, further comprising a second surface heat exchanger configured to receive heat from a second surface of the flight vehicle, and configured to increase the temperature of the second working fluid of the heat transfer loop.

19. The system of claim 13, further comprising a heat sink heat exchanger, the heat sink heat exchanger including:

a heat sink line configured to fluidly communicate with a heat sink fluid tank;

a heat sink-to-power generation loop line configured to receive the first working fluid and configured to transfer heat to the heat sink line; and a heat sink-to-heat transport loop line configured to receive the second working fluid and configured to transfer heat to the heat sink line.

20. The system of claim 13, further comprising a controller operably coupled to the first compressor and the second compressor, wherein the controller is programmed to execute a method, comprising initiating operation of the first and second compressors when an operating condition of the flight vehicle exceeds an operating threshold.

* * * * *